3,185,709
PROCESS FOR OBTAINING CRYSTAL
VIOLET LACTONE
Albert E. Munro and Nathan N. Crounse, Cincinnati, and Edward M. Davis, Amberley Village, Ohio, assignors to Sterling Drug Inc., New York, N.Y., a corporation of Delaware
No Drawing. Filed Nov. 21, 1963, Ser. No. 325,466
7 Claims. (Cl. 260—343.4)

This invention relates to a new method for obtaining 3,3 - bis(4 - dimethylaminophenyl) - 6 - dimethylaminophthalide or, as this compound has been more simply designated, crystal violet lactone.

Crystal violet lactone is used in paper-coating compositions responding to marking procedures by producing color. The economical preparation of this compound in satisfactory quality for use in such compositions presents a difficult problem. In the known methods, crystal violet lactone is prepared by treating 2-[4,4'-bis(dimethylamino)benzohydryl]-5-dimethylaminobenzoic acid in an aqueous medium with an inorganic compound which is an oxidizing agent, for instance lead dioxide, potassium permanganate, hydrogen peroxide, and potassium dichromate. A serious drawback encountered with some of these prior methods is that the initial oxidation product is readily susceptible to further oxidation by the oxidizing agent to yield dark-colored tars. In addition to lowering the yield of crystal violet lactone, such over-oxidation produces a deleterious effect on the quality of the product, for example by making it unacceptably light-sensitive. In one prior procedure, it has been proposed to reduce over-oxidation by extracting the crystal violet lactone, as it is formed, away from the oxidizing aqueous phase into a water-insoluble phase such as toluene.

It is an object of the present invention to provide a novel method whereby crystal violet lactone of high quality can be obtained in good yield economically and substantially without the adverse effects of over-oxidation.

Our new method comprises: producing crystal violet lactone by intimately admixing gaseous molecular oxygen, preferably in the form of air, with an aqueous solution of an alkali metal salt of 2-[4,4'-bis(dimethylamino)benzohydryl]-5-dimethylaminobenzoic acid at a pH in the approximate range 8 to 12.5 and at a temperature in the approximate range 15 to 160° C.; and recovering from the resulting aqueous reaction mixture the crystal violet lactone thus produced.

As will be understood, the rate at which the reaction proceeds, to produce crystal violet lactone, depends on a number of factors, including particularly the reaction temperature and the degree of contact between the reactants. The reaction proceeds satisfactorily at temperatures between approximately 15° C. and 160° C. The reaction is of course slower at the lower than at the higher temperatures within this range. For this reason, to secure the advantage of the shorter reaction periods we ordinarily use the higher reaction temperatures, for instance above 50° C. We have found that temperatures in the approximate range 90–125° C. are particularly satisfactory.

Any of the various conventional methods and devices for intimately admixing gases and liquids is suitable for effecting intimate contact between the gaseous molecular oxygen and the aqueous solution of the alkali metal 2-[4,4' - bis(dimethylamino)benzohydryl] - 5 - dimethylaminobenzoate. Thus, for example, in a simple procedure adequate for preparation of small amounts of crystal violet lactone, the gaseous molecular oxygen is bubbled through the aqueous solution of the alkali metal salt reactant until the reaction is complete. On the other hand, for production on a commercial scale, for instance several hundred or more pounds of product, it is ordinarily preferable to use apparatus effective to mix quickly and efficiently relatively large volumes of the aqueous solution and the gaseous molecular oxygen at atmospheric or super-atmospheric pressure. Thus, for example, the aqueous solution can be circulated through a Schutte-Koerting jet to produce a finely-divided spray into which there is drawn a rapid stream of gaseous molecular oxygen, preferably in the form of air, the solution being re-circulated through the jet in this matter until a test of the aqueous solution shows that no, or a negligible amount of, alkali metal 2-[4,4'-bis(dimethylamino)benzohydryl]-5-dimethylaminobenzoate starting material remains therein.

In a preferred mode of carrying out the process of our invention, we have found that the time required for completion of the reaction can be substantially reduced by dispersing diatomaceous silica or equivalent finely-divided inert water-insoluble substance in the solution of the alkali metal 2-[4,4'-bis(dimethylamino)benzohydryl]-5-dimethylaminobenzoate during the reaction. Thus, for example, it is advantageous to employ diatomaceous silica in an amount of about five to one hundred percent the weight of the alkali metal 2-[4,4'-bis(dimethylamino)benzohydryl]-5-dimethylaminobenzoate for this purpose.

It is not necessary to employ an oxidation catalyst in the process of our invention, which is fully operative to yield satisfactory results in the absence of catalysts of this type. Optionally, however, there can be employed an oxidation catalyst, for example manganese palmitate or manganese stearate, effective to increase the rate of the oxidation reaction, that is, the rate of conversion of the alkali metal 2-[4,4'-bis(dimethylamino)benzohydryl]-5-dimethylaminobenzoate to crystal violet lactone.

Crystal violet lactone is substantially insoluble in water and therefore can be easily and conveniently recovered from the aqueous reaction mixture, for instance by collecting the product on a filter. When the aqueous reaction mixture contains a water-insoluble compound such as an oxidation catalyst and/or a water-insoluble reaction promoter, for instance diatomaceous silica, which would of course be collected on a filter along with the desired product, the crystal violet lactone can be readily recovered by extracting it into an organic solvent such as toluene and then removing the solvent from the resulting solution.

The use of gaseous molecular oxygen as the oxidizing agent in the method of this invention of course obviates the necessity of separating any unused oxidizing agent or decomposition products thereof from the crystal violet lactone. Moreover, especially when air is employed, our new method affords substantial economic advantage over the use of other oxidizing agents. As a further and particularly valuable advantage, in our new method the crystal violet lactone is produced in high quality and good yield and this product remains virtually unaffected in the reaction mixture even when exposed to a large excess of the gaseous molecular oxygen for extended reaction periods, such as illustrated in Example 1 below. This result is in sharp contrast with the deleterious effects of over-oxidation which are encountered when excess amounts of the oxidizing agents used in the prior methods are allowed to remain in contact with the crystal violet lactone in the reaction mixture.

As a still further advantage, the method of this invention is more readily adapted than are the prior methods to the preparation of relatively large batches (for instance, several hundred pounds per batch) of crystal violet lactone.

Our invention is illustrated by the following examples without, however, being limited thereto.

Example 1

(A) To a mixture of 399 pounds of crude 2-[4,4'-bis-(dimethylamino)benzohydryl] - 5 - dimethylaminobenzoic acid in the form of a water-wet pulp weighing about 1300 pounds and 2660 pounds of water there were added 80 pounds of 50 percent aqueous sodium hydroxide solution, 20 pounds of diatomaceous silica (Dicalite—Dicalite Co)., and 40 pounds of decolorizing activated carbon (Nuchar N—West Virginia Pulp and Paper Co.). The resulting mixture was heated at 70° C. for one hour and was then filtered. The filtrate thus obtained was an aqueous solution of sodium 2-[4,4'-bis(dimethylamino)benzohydryl]-5-dimethylaminozenzoate. The solid on the filter was washed with 25 gallons of hot (70° C.) water to recover a small additional quantity of the same salt and the resulting filtrate was added to the first filtrate, and the solution was diluted with water to a volume of 387 gallons. By assay of an aliquot, it was found that the solution contained approximately 211 pounds of sodium 2 - [4,4' - bis(dimethylamino)benzohydryl] - 5 - dimethylaminobenzoate.

(B) To the solution obtained as described in part (A) above there was added 84 pounds of sodium bicarbonate and this was followed by 60 pounds of diatomaceous silica. The resulting mixture, which had a pH of approximately 9, was aerated by pumping and re-circulating it at 90–95° C. through an eight-inch Schutte-Koerting jet (with capacity of approximately 500 cubic feet of gas per minute) with gas intake open to the atmosphere, the exhaust air being vented and the pressure at the jet nozzle being 40–50 pounds per square inch. (If excessive foaming occurs, this can be satisfactorily reduced by adding one to two pints of tributyl phosphate.) During this re-circulation at 90–95° C., after each four hour interval the solution was restored to a volume of 387 gallons by addition of water, and a quart sample of the solution was then tested by ultraviolet analysis to detect the presence of sodium 2-[4,4'-bis(dimethylamino)benzohydryl]-5-dimethylaminobenzoate. This test for the starting material was strongly positive in each instance until a weakly positive test was obtained when the mixture had been thus aerated for fifty-two hours. The reaction was then terminated and the reaction mixture was cooled to 70° C. and filtered. The solid thus collected was washed on the filter with water until the filtrate was neutral to Brilliant Yellow indicator. The major portion of the water was then sucked from the solid to yield 433 pounds of crude wet pulp which was found to consist of: 238 pounds of crystal violet lactone; 135 pounds of water; and 60 pounds of diatomaceous silica.

The separation of the crystal violet lactone from the crude wet pulp containing it was carried out by adding, per pound of pulp, approximately 3 pounds of toluene and approximately one-quarter pound of decolorizing activated carbon (Darco KB—Atlas Powder Co.), heating the mixture at 70° C. for one hour, filtering through a pre-heated filter, separating the water layer from the toluene layer in the filtrate, concentrating and then cooling the filtrate, and collecting the solid which separated from solution. By this procedure 71.4 percent of the crystal violet lactone in the crude wet pulp was isolated as a light-tan powder having a melting point of 176–179° C. Assay of this product by hydrolysis with hydrochloric acid and titration with titanium trichloride to determine reducible hydroxyl (available by hydrolysis of the lactone ring) gave a value of 100.7 percent. This product was found to meet all required standards for use in the paper-coating compositions in which crystal violet lactone finds its principal use.

Example 2

To 4800 ml. of an aqueous solution of 350 g. of sodium 2 - [4,4' - bis(dimethylamino)benzohydryl] - 5 - dimethylaminobenzoate there was added 1.00 g. of manganese stearate oxidation catalyst (prepared by mixing 0.25 g. of soap, 1.0 g. of manganese sulfate, and 200 ml. of 50 percent aqueous sodium hydroxide solution). Air was bubbled through the mixture at 55–60° C. until only a negligible amount of sodium 2-[4,4'-bis(dimethylamino)benzohydryl]-5-dimethylaminobenzoate remained in the reaction mixture. There was then isolated from the reaction mixture 308 g. of crystal violet lactone by the following procedure: Glacial acetic acid was added to the reaction mixture until the pH of the mixture was lowered to approximately 6–7 and then the mixture was heated to 65–80° C. and was extracted with four 200 ml. portions of toluene. The aqueous layer was then discarded. The toluene extracts were combined and the toluene was removed by evaporation. The product thus obtained as a residue was tan in color, melted at 157–173° C., and gave a value of 73.9 percent by hydrochloric acid-titanium chloride assay. Purification of this product by recrystallization from toluene yielded crystalline violet lactone as a light-tan solid which melted at 176–179° C. and was indistinguishable from the product of Example 1 above.

Example 3

A mixture of 667 of 667 ml. of an aqueous solution of 49.1 g. of sodium 2-[4,4'-bis(dimethylamino)benzohydryl]-5-dimethylaminobenzoate having a pH of approximately 11 and 15 g. of diatomaceous silica was heated at 90–95° C. in a one-liter steel-lined autoclave, the air being allowed to vent off. The vent was then closed, and oxygen was passed into the autoclave until the pressure was 50 pounds per square inch. The autoclave contents were then heated at 90–95° C. for eight hours, more oxygen being passed into the autoclave as needed to maintain the pressure at 50 pounds per square inch. The reaction mixture was filtered and the solid collected on the filter was washed with water. The solid product thus obtained weighed 57 g. and consisted of 42 g. of crude crystal violet lactone and 15 g. of diatomaceous silica. The crystal violet lactone was extracted from the product with hot toluene and the resulting solution was treated with decolorizing carbon and filtered. The filtrate was evaporated until the temperature of the solution reached 125° C. and 120 ml. of n-butyl alcohol was added to precipitate the crystal violet lactone, which was collected by cooling the mixture to room temperature and filtering it. The solid thus collected, which weighed 30 g., was crystal violet lactone, M.P. 176–179° C.

Example 4

A mixture of 633 ml. of an aqueous solution of 75.3 g. of sodium 2-[4,4'-bis(dimethylamino)benzohydryl]-5-dimethylaminobenzoate at a pH of approximately 11 and 15 g. of diatomaceous silica was heated in a one-liter steel-lined autoclave to 95° C. Nitrogen was introduced into the autoclave until the pressure reached 15 pounds per square inch and then oxygen was added until the pressure reached 30 pounds per square inch. The autoclave contents were heated for ten and one-half hours at 90–95° C., oxygen being added as needed to maintain the pressure at 30 pounds per square inch. The reaction mixture was then filtered, and the solid thus collected was washed with water and dried. The solid product obtained in this manner weighed 72.5 g. and consisted of 57.5 g. of crude crystal violet lactone and 15 g. of diatomaceous silica. The crystal violet lactone was dissolved in hot toluene, and the resulting solution was treated with decolorizing carbon and filtered, and the toluene was evaporated from the filtrate to yield 57.5 g. of crystal violet lactone. For most uses, this product would require further purification, for instance in the manner described in the foregoing examples.

Example 5

To 2 liters of an aqueous solution containing 102.4 g. of sodium 2-[4,4'-bis(dimethylamino)benzohydryl]-5-dimethylaminobenzoate there were added 60.0 g. of sodium bicarbonate and 27.0 g. of diatomaceous silica. The resulting mixture, which had a pH of approximately 9.4, was heated and stirred two and one-half hours in an autoclave at 125° C. while applying to the mixture 100 pounds per square inch of compressed air pressure. The reaction mixture was then cooled and filtered, and the solid thus collected was washed with water and sucked partially dry. There was thus obtained 246 g. of crude wet pulp which when dried at 105° C. for seventy-two hours at atmospheric pressure weighed 137.8 g. By hydrochloric acid-titanium trichloride assay this product was found to contain 73.2 percent of crystal violet lactone, the remainder consisting substantially of diatomaceous silica.

The use of potassium 2-[4,4'-bis(dimethylamino)-benzohydryl]-5-dimethylaminobenzoate in place of the corresponding sodium salt in the foregoing examples yields results substantially identical with those therein described.

The alkali metal salts of 2-[4,4'-bis(dimethylamino)benzohydryl]-5-dimethylaminobenzoic acid used as starting materials in the method of this invention are readily available by conventional procedures. Conveniently, the acid is mixed with an aqueous solution of an alkali metal hydroxide, for instance sodium or potassium hydroxide, and the resulting solution is adjusted to a pH in the approximate range 8–12.5, preferably about 9.

This application is a continuation-in-part of our prior copending application Serial No. 187,934, filed April 16, 1962, now abandoned.

We claim:

1. The method which comprises: producing crystal violet lactone by intimately admixing gaseous molecular oxygen with an aqueous solution of an alkali metal salt of 2-[4,4'-bis(dimethylamino)benzohydryl]-5-dimethylaminobenzoic acid at a pH in the approximate range 8 to 12.5 and at a temperature in the approximate range 15 to 160° C.; and recovering from the resulting aqueous reaction mixture the crystal violet lactone thus produced.

2. The method which comprises: producing crystal violet lactone by intimately admixing gaseous molecular oxygen with an aqueous solution of an alkali metal salt of 2-[4,4'-bis(dimethylamino)benzohydryl]-5-dimethylaminobenzoic acid at a pH in the approximate range 8 to 12.5 and at a temperature in the approximate range 90 to 125° C.; and recovering from the resulting aqueous reaction mixture the crystal violet lactone thus produced.

3. The method which comprises: producing a crystal violet lactone by intimately admixing gaseous molecular oxygen with an aqueous solution of an alkali metal salt of 2-[4,4'-bis(dimethylamino)benzohydryl]-5-dimethylaminobenzoic acid at a pH in the approximate range 8 to 12.5 and at a temperature in the approximate range 15 to 160° C., said solution having diatomaceous silica dispersed therein; and recovering from the resulting aqueous reaction mixture the crystal violet lactone thus produced.

4. The method which comprises: producing crystal violet lactone by intimately admixing air with an aqueous solution of an alkali metal salt of 2-[4,4'-bis(dimethylamino)benzohydryl]-5-dimethylaminobenzoic acid at a pH of approximately 9 and at a temperature in the approximate range 90–125° C., said solution having diatomaceous silica dispersed therein; and recovering from the resulting aqueous reaction mixture the crystal violet lactone thus produced.

5. The method which comprises: producing crystal violet lactone by intimately admixing air with an aqueous solution of the sodium salt of 2-[4,4'-bis(dimethylamino)benzohydryl]-5-dimethylaminobenzoic acid at a pH of approximately 9 and at a temperature in the approximate range 90–125° C. said solution having diatomaceous silica dispersed therein in an amount by weight which is approximately five to one hundred percent the weight of the said sodium salt; and recovering from the resulting aqueous reaction mixture the crystal violet lactone thus produced.

6. The method of claim 1 wherein the gaseous molecular oxygen is in the form of air.

7. The method which comprises: producing crystal violet lactone by intimately admixing gaseous molecular oxygen with an aqueous solution of an alkali metal salt of 2-[4,4'-bis(dimethylamino)benzohydryl]-5-dimethylaminobenzoic acid at a pH in the approximate range 8 to 12.5 and at a temperature in the approximate range 15 to 160° C. in the presence of an oxidation catalyst effective to increase the rate of the oxidation reaction; and recovering from the resulting aqueous reaction mixture the crystal violet lactone thus produced.

References Cited by the Examiner

UNITED STATES PATENTS

| | | | |
|---|---|---|---|
| 1,813,606 | 7/31 | Binapfl et al. | 260—618 |
| 2,742,483 | 4/56 | Crounse | 260—343.4 |
| 2,938,924 | 5/60 | Simon et al. | 260—618 |
| 2,954,405 | 9/60 | Hock et al. | 260—618 |

IRVING MARCUS, *Primary Examiner.*

JOHN D. RANDOLPH, *Examiner.*